Figure 1:
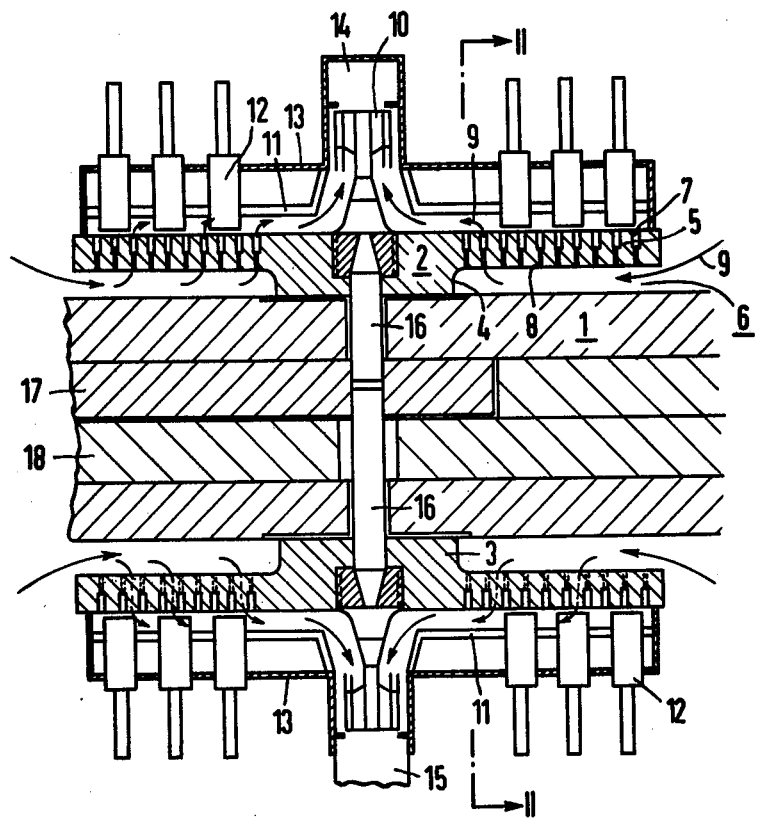

United States Patent [19]

Krieger

[11] 4,137,474

[45] Jan. 30, 1979

[54] GAS-COOLED SLIP RING FOR ELECTRICAL MACHINES

[75] Inventor: Gerd Krieger, Mülheim, Germany

[73] Assignee: Kraftwerk Union Aktiengesellschaft, Mülheim, Germany

[21] Appl. No.: 742,637

[22] Filed: Nov. 17, 1976

Related U.S. Application Data

[63] Continuation of Ser. No. 581,973, May 29, 1975, abandoned.

[30] Foreign Application Priority Data

Jun. 4, 1974 [DE] Fed. Rep. of Germany ....... 2426823

[51] Int. Cl.² .............................................. H02K 9/28
[52] U.S. Cl. .................................... 310/227; 310/232
[58] Field of Search .................. 310/54, 58, 59, 61, 310/52, 43, 232, 227, 219, 235, 62, 63

[56] References Cited

U.S. PATENT DOCUMENTS

| 919,626 | 4/1909 | Noeggerath | 310/232 |
|---|---|---|---|
| 1,010,522 | 12/1911 | Roos | 310/61 |
| 3,784,855 | 1/1974 | Motegi | 310/227 |
| 3,997,803 | 12/1976 | Mishra | 310/59 |

FOREIGN PATENT DOCUMENTS

| 905511 | 1/1954 | Fed. Rep. of Germany | 310/227 |
|---|---|---|---|
| 1266866 | 4/1968 | Fed. Rep. of Germany | 310/227 |
| 821444 | 10/1959 | United Kingdom | 310/227 |

Primary Examiner—R. Skudy
Attorney, Agent, or Firm—Herbert L. Lerner

[57] ABSTRACT

Gas-cooled slip ring for electrical machines mountable on a slip-ring shaft including a hub fastenable on the slip-ring shaft in insulating relationship thereto, and, a ring flange extending in axial direction from both sides of the hub, the slip ring being formed with a radially outer surface having a multiplicity of mutually adjacent grooves incised therein, and a radially inner surface spaced from the surface of the slip-ring shaft when the hub is fastened thereon and defining therewith a plurality of ring channels serving as coolant gas supply channels, radially inner surface of the ring flange being formed with incised notches shaped as substantially circular segments and extending in radial direction, the incised notches connecting the grooves to the ring channel.

3 Claims, 2 Drawing Figures

U.S. Patent    Jan. 30, 1979    4,137,474

GAS-COOLED SLIP RING FOR ELECTRICAL MACHINES

This is a continuation, of application Ser. No. 581,973, filed May 29, 1975 now abandoned.

The invention relates to a gas-cooled slip ring for electrical machines and, more particularly, to such a slip ring formed with mutually adjacent grooves incised in the outer surface of the slip ring and connected with coolant gas supply channels extending in axial direction of the slip ring.

A slip ring of this general type is disclosed in German Published Prosecuted Application DT-AS No. 1,266,866, wherein coolant gas feed to the outer surface of the slip ring is effected through axial bores cut into the body of the slip ring and which are intersected by the grooves incised in the outer surface of the slip ring. Such a construction of the gas supply channels produces a high flow resistance, however, so that the coolant gas throughput or flow rate can be inadequate for the slip ring at high loads.

It is accordingly an object of the invention to provide a gas-cooled slip ring of the foregoing type which is of relatively simplified construction and which can be optimally cooled while reducing the flow resistance therein.

With the foregoing and other objects in view, there is provided, in accordance with the invention, a gas-cooled slip ring for electrical machines mountable on a slip-ring shaft and comprising a hub fastenable on the slip-ring shaft in insulating relationship thereto, and, a ring flange extending in axial direction from both sides of the hub, the slip ring being formed with a radially outer surface having a multiplicity of mutually adjacent grooves incised therein, and a radially inner surface spaced from the surface of the slip-ring shaft when the hub is fastened thereon and defining therewith a plurality of ring channels serving as coolant gas supply channels, radially inner surface of the ring flange being formed with incised notches shaped as substantially circular segments and extending in radial direction, the incised notches connecting the grooves to the ring channels.

In accordance with another feature of the invention, a radial blower is secured to the radially outer surface of the hub substantially in the central plane of the slip ring. Encapsulating means formed of insulating material encloses the radial blower, and a coolant gas discharge channel extends from the encapsulating means at the periphery of the radial blower.

In accordance with a further feature of the invention, the gas-cooled slip ring has brush holders mounted thereon and carrying receptacles for slip-ring brushes, the brush holders and the receptacles being received together with the radial blower in the encapsulating means.

Other features which are considered as characteristic for the invention are set forth in the appended claims.

Although the invention is illustrated and described herein as embodied in gas-cooled slip ring for electrical machines, it is nevertheless not intended to be limited to the details shown, since various modifications and structural changes may be made therein without departing from the spirit of the invention and within the scope and range of equivalents of the claims.

Figure 2:
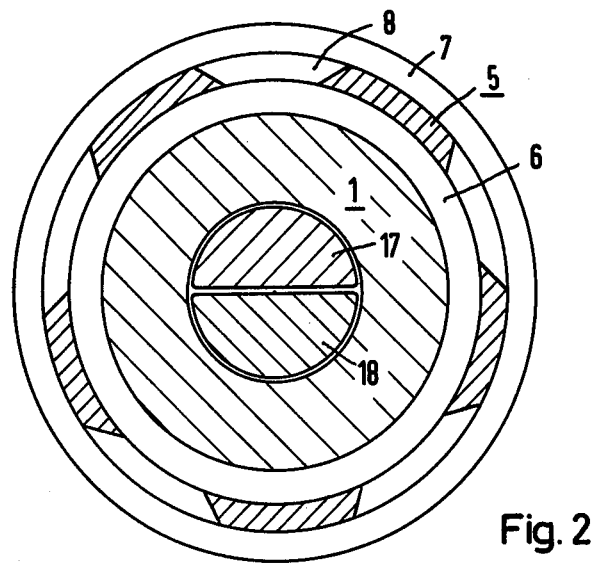

The construction and method of operation of the invention, however, together with additional objects and advantages thereof will be best understood from the following description of specific embodiments when read in connection with the accompanying drawings, in which:

FIG. 1 is a longitudinal sectional view of part of a slip-ring shaft and a slip ring mounted thereon and constructed in accordance with the invention; and FIG. 2 is a cross-sectional view of FIG. 1 taken along the line II—II thereof in direction of the arrows, but with the brush carrier and encapsulation omitted.

Referring now to the drawing and first, particularly to FIG. 1 thereof, there is shown, in longitudinal sectional view, a slip ring shaft 1 on which a slip ring 2 is mounted, separated therefrom by an insulating shim 3. The slip ring 2 is formed of a hub 4 and a ring flange 5 extending on both sides thereof in axial direction of the shaft 1. The inner periphery of the slip-ring shaft 1 border on and define an annular or ring channel 6 which serves to conduct coolant gas. Thread-like grooves 7 are incised in the surface of the ring flange 5 and are connected to the ring channels 6 through circular incised notches 8 spaced axially along as well as circumferentially about the ring flange 5, such as are shown with greater particularity in FIG. 2. In this way the coolant gas, as indicated by the arrows 9 in FIG. 1, can flow through the slip ring 2 through the ring channels 6. The incised notches 8 and the grooves 7 from the inside of the slip ring toward the outside thereof and can thereby provide effective cooling.

Furthermore, a radial blower or fan 10 is located in the central plane of the slip ring 2, at the periphery of the slip ring, and revolves together with the slip ring 2. Stationary brush holders 11 and sockets or receptacles 12 for the slip-ring brushes, as well as the radial blower or fan 10 are, furthermore, enclosed by an encapsulation or capsule 13. The encapsulation 13 is expanded in vicinity of the radial blower or fan 10 to a radially outwardly extending ring chamber 14 from which a coolant gas outlet channel 15 branches off.

The coolant gas thus enters from the right-hand side as viewed in FIG. 1 and travels along a path represented by the arrows 9 into the ring channels 6, then through the incised notches 8 and the grooves 7 to the radially outer surface of the slip ring 2, and is blown by the radial blower or fan 10 into the ring channel 14 and the discharge channel 15. Current is drawn in a conventional manner through radial pins 16 from the ship ring 2 to exciter current lines 17 which extend coaxially to and within the shaft. The positive pole is illustrated in the figures of the drawing, the exciter current being conducted therefrom through the lines 17. The line 18 located below the exciter current line 17, as shown in the figures, leads to the non-illustrated negative pole - slip ring, which is constructed, however, in a manner similar to the positive pole as viewed in the figures.

By means of the aforedescribed construction of the slip ring 2 and the coolant channels 6, 8, 7, 14, 15, optimal cooling of the slip ring 2 and the surface thereof is possible, the flow resistance encountered by the coolant gas therein being markedly reduced as compared to conventional i.e. heretofore known, gas-cooled slip rings for electrical machines.

It is claimed:

1. Gas-cooled slip ring for mounting on a slip ring shaft of electrical machines comprising a hub having means for mounting the same on the slip-ring shaft in insulating relationship thereto, and a ring flange extending in axial direction from both sides of said hub, said ring flange having a radially outer surface with a multiplicity of mutually adjacent axially spaced radially extending grooves incised therein, and a radially inner surface spaced from the surface of the slip-ring shaft and defining therewith a pair of axially extending ring channels serving as coolant gas supply channels, said ring flange having a plurality of incised notches shaped as substantially circular segments spaced axially along as well as circumferentially about said ring flange and extending from said grooves in radial direction to said ring channels, said incised notches and said radially extending grooves defining direct radial gas flow paths from said ring channels through said ring flange.

2. Gas-cooled slip ring according to claim 1 including a radial blower secured to the radially outer surface of said hub substantially in the central plane of the slip ring, encapsulating means formed of insulating material and enclosing said radial blower, and a coolant gas discharge channel extending from said encapsulating means at the periphery of said radial blower.

3. Gas-cooled slip ring according to claim 1 in combination with brush holders mounted thereon and carrying receptacles for slip-ring brushes, said brush holders and said receptacles being rceived together with said radial blower in said encapsulating means.

* * * * *